United States Patent [19]

Martinez-Vera et al.

[11] 4,449,671

[45] May 22, 1984

[54] APPARATUS FOR SEPARATING AGGLOMERATED PARTICULATE MATTER

[75] Inventors: Enrique R. Martinez-Vera; Gilberto Guerra-Garcia, both of Monterrey, Mexico

[73] Assignee: Hylsa, S.A., Monterrey, Mexico

[21] Appl. No.: 289,998

[22] Filed: Aug. 4, 1981

Related U.S. Application Data

[63] Continuation-in-part of Ser. No. 254,441, Apr. 15, 1981, abandoned.

[51] Int. Cl.³ ............................................. B02C 23/00
[52] U.S. Cl. ...................................... 241/36; 110/255; 241/283
[58] Field of Search ...................... 241/33, 36, 99, 283, 241/168, 169, 169.2, 94; 222/149, 322, 501; 110/255, 289, 327, 105, 108, 293

[56] References Cited

U.S. PATENT DOCUMENTS

| 1,311,524 | 7/1919 | Lee | 110/105 |
| 4,004,739 | 1/1977 | Cramer | 241/36 |
| 4,118,017 | 10/1978 | Hendrickson | |
| 4,120,461 | 10/1978 | Sorensen | 241/283 |
| 4,291,753 | 9/1981 | Fisher et al. | 241/283 |

FOREIGN PATENT DOCUMENTS

| 47-984 | 1/1972 | Japan | 241/283 |
| 305569 | 7/1929 | United Kingdom . | |
| 524706 | 8/1940 | United Kingdom . | |
| 624630 | 6/1949 | United Kingdom . | |
| 891135 | 3/1962 | United Kingdom . | |
| 988434 | 4/1965 | United Kingdom . | |
| 2018409A | 10/1979 | United Kingdom . | |
| 497408 | 3/1976 | U.S.S.R. . | |

Primary Examiner—Mark Rosenbaum
Assistant Examiner—Timothy V. Eley
Attorney, Agent, or Firm—Curtis, Morris & Safford

[57] ABSTRACT

Apparatus for breaking apart agglomerations of particulate matter flowing in a vessel (particularly useful ina pressurized moving-bed vertical-shaft reduction reactor for the production of sponge iron) is exemplified by an externally mounted hydraulic cylinder having access to the interior of said vessel through a probe port, the piston of said hydraulic cylinder being provided with a conical probe positioned so as to be normally retracted out from the interior of said vessel but extendable by said hydraulic cylinder into and across the interior of said vessel, preferably at the narrowed discharge portion thereof, whereby said probe is angled to extend downwardly in the direction of flow of said particulate matter as well as across said flow to engage and break up any agglomerations of particulate matter in its path. When used with a pressurized vessel, the probe may be uniquely adapted to function without reactor pressure loss by a housing for the probe, or alternatively for the entire probe and hydraulic cylinder, with said housing having open communication with said vessel, so as to minimize sealing problems with respect to the moving probe. In a reduction reactor, the probe is preferably mounted near the bottom of the cooling zone adjacent the narrowed discharge outlet so as normally to be retracted to avoid any obstruction of the uniform flow through the reactor, and yet be angled along and across the direction of flow to assist in the discharge and also intercept and break up agglomerations obstructing the narrowed discharge.

26 Claims, 8 Drawing Figures

APPARATUS FOR SEPARATING AGGLOMERATED PARTICULATE MATTER

This is a continuation-in-part application of pending application Ser. No. 254,441 filed Apr. 15, 1981, now abandoned.

BACKGROUND OF THE INVENTION

This invention relates generally to an apparatus for breaking apart agglomerated particulate matter and particularly for breaking up agglomerated sponge iron in a moving-bed vertical-shaft reduction reactor to maintain the mass flow of such particulate matter through the reactor and prevent a plugging of the typical convergently-restricted outlet. The present invention can also be more broadly employed to maintain the flow of other types of particulate or granular matter and to prevent the plugging of the outlet in similar applications.

In general, the production of sponge iron in a vertical moving-bed reactor involves two principal steps, namely, reduction of the ore with a suitable hot reducing gas in a reduction zone of the reactor and then subsequent cooling of the resulting sponge iron with gaseous coolant in a cooling zone of the reactor. Preferably, the reducing gas is largely composed of carbon monoxide and hydrogen at temperatures of the order of 750° C. to 1100° C., and more preferably 900° C. to 1000° C. and at pressures above atmospheric pressure. The hot reducing gas is usually introduced at the bottom of the reduction zone and passed upwardly through the reactor countercurrent to the particulate flow, to reduce the ore to metal. Cooling of the reduced sponge iron may be effected by a separate cooling loop (as in U.S. Pat. No. 3,765,872 issued Oct. 6, 1973, the disclosure of which is incorporated herein by reference) or by other known alternatives.

The solid ore particles or pellets are charged under pressure to the top of the moving-bed reactor. After reduction in the upper zone and cooling in the lower zone to a relatively low temperature, the sponge iron is discharged from a preferably conically convergent discharge outlet at the bottom of the reactor.

One problem in any continuous moving-bed reduction reactor system is the tendency of the sponge iron to cluster or agglomerate under certain operating conditions or through equipment failure as the sponge iron moves through the reactor. This tendency differs for different grades and sources of iron ore. Such agglomeration is affected by such factors as gangue composition of the iron ore. lumps or pellets, geometry of the latter or of the reactor, reducing gas composition, flow characteristics and solids residence time, processing temperatures and pressures and other not-fully determined variables. High operating temperatures can increase production and reduce capital cost, but also increase risk of agglomeration. Thus there is an incentive for the plant operators to run the process at as high temperatures as possible (in spite of agglomeration risks). When the sponge iron agglomerates in a moving-bed reactor system, the mass flow of the solids through the reactor is distorted, giving an uneven product. The movement of the sponge iron bed may even stop, thereby plugging the reactor at its outlet end and result in a costly shut down with concomitant production loss. If the plugging of the reactor is sufficiently great, serious damage to the reactor itself can also result. Also, an agglomeration, which is proportionally small in the large diameter portion of the reactor (e.g., in the reduction zone), can be significantly large at the constricted discharge outlet; so as to block flow unless broken up.

A need exists for an apparatus to break up internal clusters of agglomerated sponge iron to maintain the proper mass flow of the solids through the reactor without necessitating the shut down of the reactor to remove clusters and without impeding the flow of the ore mass which has been reduced in the reactor.

The problem of agglomeration has long been recognized in the prior art, particularly in the direct reduction of iron ore. The prior solutions to this problem have not been very practical in commercial operation; often creating additional problems. For example, most solutions involve reciprocating or rotating rakes which are permanently positioned within the reactor, causing obstruction to uniform flow and often directly subject to continuous abrasion and elevated temperatures (even when not needed). See for example U.S. Pat. Nos. 2,862,808 and 4,118,017.

OBJECTS AND SUMMARY OF THE INVENTION

It is accordingly an object of the present invention to provide an apparatus which alleviates the above identified problems. It is another object of the present invention to provide an apparatus for breaking apart agglomerated particulate material. It is a further object of the invention to provide an apparatus for breaking up clusters of sponge iron in a moving-bed reactor system to maintain the uniform mass flow of the sponge iron. It is still another object of the invention to provide an apparatus to keep the discharge end of a pressurized reactor free of obstruction.

The objects and advantages of the present invention may be achieved, in general, by providing a retractable breaker assembly, preferable in pairs, each having a piston shaft with a probe extending therefrom in a breaker housing secured to the moving-bed vertical-shaft reactor in the vicinity of the outlet port. The breaker assembly opens into the interior of the reactor so that the probe may be extended hydraulically or otherwise into the discharge portion of the reactor. The probe will break up any clusters or agglomerations of particulate matter which are building up or accumulating in the vicinity of the outlet port. The angle of the breaker housing and associated probe are such as to be similar to the direction of flow of the particulate matter, thereby aiding in the flow and minimizing any restraint on the mass flow as the result of insertion of the probe into the moving-bed reactor. Each probe of a pair preferably functions alternately with the other and slightly axially displaced relative to the reactor, one from the other.

In this specification and the accompanying drawings, we have shown and described a preferred embodiment of our invention and have suggested various alternatives and modifications thereof, but it is to be understood that these are not intended to be exhaustive and that many other changes and modifications can be made within the scope of the invention. These suggestions herein are selected and included only for purposes of illustration in order that others skilled in the art will more fully understand the invention and the principles thereof and will thus be enabled to modify it and embody it in a variety of forms, each as may be best suited to the conditions of a particular use.

BRIEF DESCRIPTION OF THE DRAWINGS

FIG. 2A is a fragmentary vertical section of an optional plug valve mounted in the probe pipe for isolating the breaker assembly from the pressure in the reactor.

DETAILED DESCRIPTION OF THE DRAWINGS AND PREFERRED EMBODIMENTS OF THE INVENTION

Figure 1:
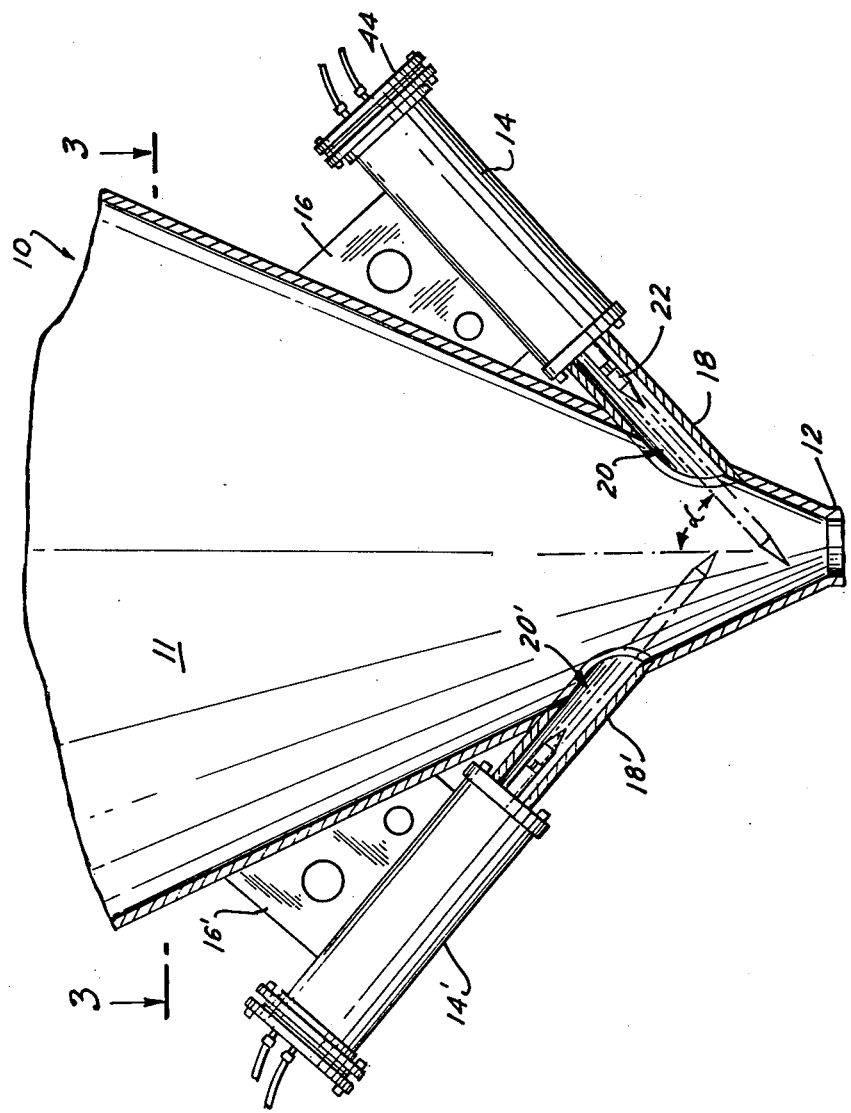
FIG. 1 is a side elevation, taken partially in section, of a conical discharge port for a vertical-shaft moving-bed reactor employing two axially off-set retractable breaker assemblies (showing the extended position of the probes in dash-dot outline).

Referring to FIGS. 1 to 4 of the drawings and particularly to FIG. 1, the lower conical discharge portion 11 of the vertical-shaft moving-bed reactor 10 has an outlet port 12 from which the reduced ore in the form of sponge iron leaves the reactor 10. The reactor 10 typically has at least a primary reduction zone, and a cooling zone. In this first illustrated preferred embodiment, a pressure housing 14 is secured to the exterior of the reactor 10 by a support plate 16 welded to the exterior of the discharge portion 11 in the vicinity of the outlet port 12. A second pressure housing 14' is also shown (wherein similar parts are designated by the same reference numbers, but differentiated by a prime (')). At the lower end of the housing 14 there is a probe pipe 18. This extends downwardly from the housing 14, through the wall of the discharge portion 11, and is welded flush with inner surface of the wall of the latter to form a probe port 20.

Figure 2:
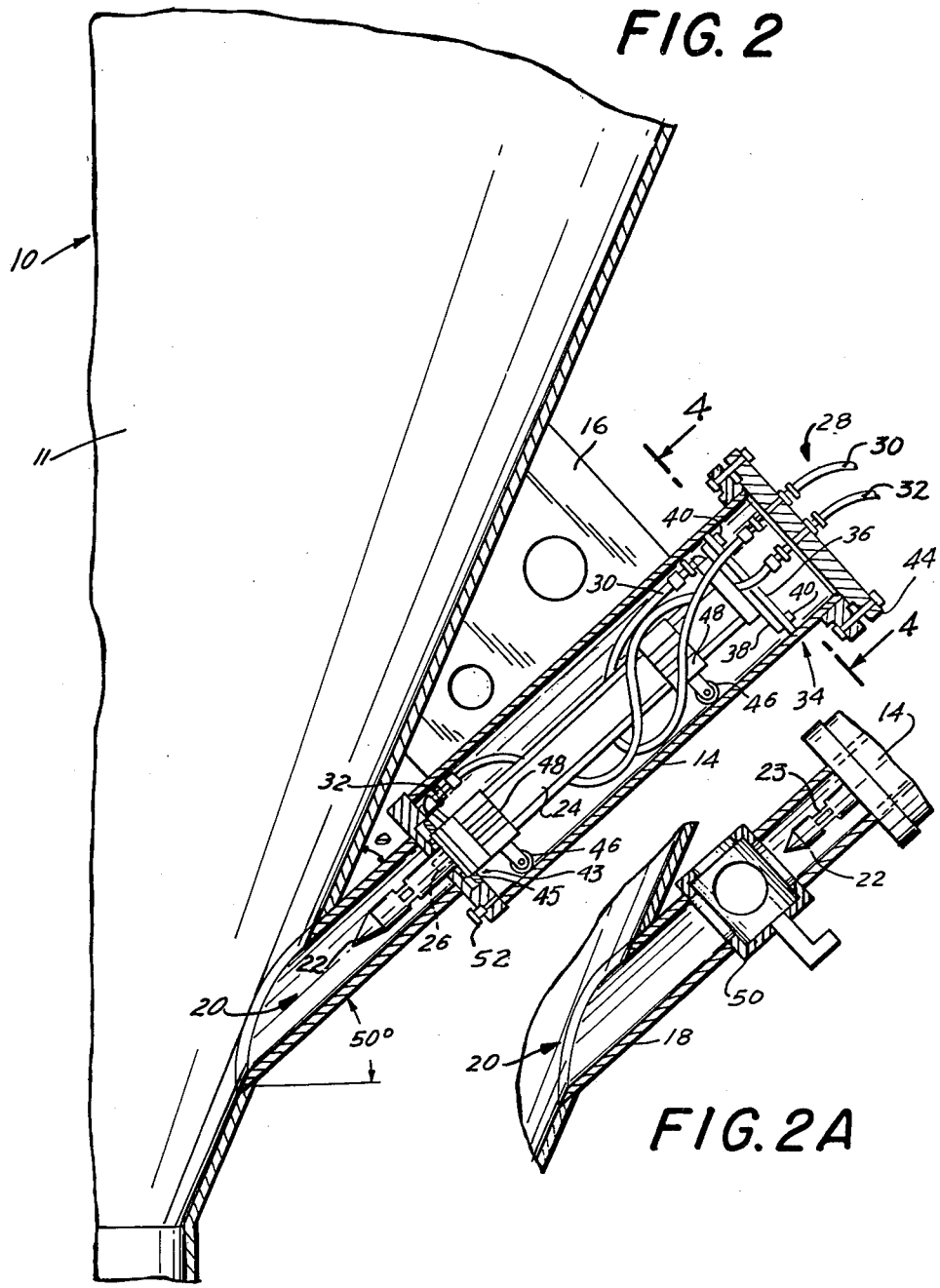
FIG. 2 is a vertical section taken on the line 2—2 of FIG. 3, showing a particular configuration for the breaker assembly and associated hydraulics.

Referring to FIGS. 1 and 2, a probe 22 extends downwardly from the lower end of the housing 14 in concentric alignment within the probe pipe 18. The probe 22 is extendable into the discharge portion 11 of the reactor 10 via the probe port 20. The probe 22 is set an an angle α, which is acute relative to the direction of flow of the particulate mass within the reactor. As is particularly shown in FIG. 2, the actuating means is a hydraulic motor 24, which is removably secured within the pressure housing 14. The hydraulic cylinder 24 has a piston shaft 26 at the end of which a probe 22 is formed or secured. The piston shaft 26 is extendable downwardly into the interior of the discharge portion 11, preferably in the vicinity of the outlet port 12, upon activation of the hydraulic motor 24 by the hydraulic pressure assembly 28 (comprised of lines 30 and 32, etc.).

The diameter of probe pipe 18 should be selected so as to prevent any particulate matter from filling up the space between the interior wall of the probe pipe 18 and the probe 22. In particular, the difference between the relative diameters of the probe 22 and the probe pipe 18 should be sufficiently large so as to assure that any particulate matter which is picked up by the probe 22, when extended into the reactor 10, will be free to fall back again into the discharge portion 11 and not become wedged within the area between the probe 22 and the probe pipe 18 (when the probe 22 is returned to its resting position). This clearance should be greater than the mean size of the larger particles (e.g. a difference in radii of the probe 22 and pipe 18 of two inches or more for sponge iron).

Similarly, a criterion for selecting a preferred angle of the probe pipe 18 relative to the angle of the discharge portion wall 11, and to the direction of flow of the mass of particulate matter, is based upon the need to maintain sufficiently open clearances to assure that solid particles will fall back into the particulate bed due to the downward force of gravity.

Also, the probe pipe 18 advantageously should be of a size to give good structural support.

Figure 4:
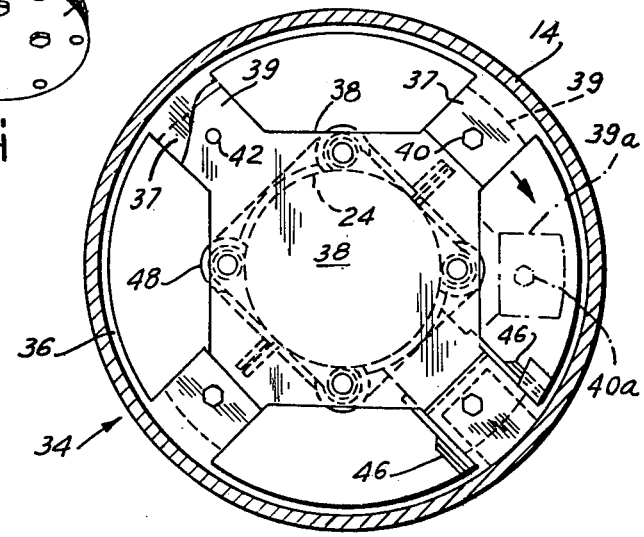
FIG. 4 is an enlarged section of a sealing plate assembly for the breaker assembly showing the sealing arrangement to maintain the interior of the breaker housing (shown as a pressure housing) at the pressure of the reactor, taken as though along line 4—4 in FIG. 2 (and showing the piston plate also alternatively positioned in dashdot outline at 45° from its fixed position, in the removal position).

As is best shown in FIG. 2 and 4 taken together, the entire pressure housing 14 can preferably be maintained at the same pressure as the interior of the reactor 10. This is particularly applicable in a reactor 10 in which iron ore is being reduced under several atmospheres of pressure (for example, 30 to 80 psig). In order to accomplish this in the configuration shown, an anchoring means in the form of a plate assembly 34 is employed. The plate assembly 34 comprises a first piston plate 38 (secured to the end of the hydraulic cylinder 24 at its end opposite the probe 22) and a second housing plate 36 (welded to the interior wall of the pressure housing 14). The housing plate 36 has a plurality of inwardly directed integral tabs 37 (four in the illustrated embodiment). These are complementary to the configuration of the piston plate 38 and its corresponding tabs 39. The plate 38 (carrying hydraulic cylinder 24), is secured to plate 36 (and thus housing 14) by bolts 40 (in bolt holes 42).

In operation, the hydraulic cylinder 24 and associated piston plate 38 are lowered into the housing 14 such that the piston plate 38 extends below the level of the housing plate 36. The front end of hydraulic cylinder 24 is centered at probe pipe 18 and fits into a socket assembly 43. The latter assembly 43 forms a recess in which said front end is securely seated. Said recess may have a chamfered opening to help guide the cylinder 24 into its seated position therein. Alternatively, as illustrated, with the recess 43 being circular and the end of the housing 14 being square; therefore a circular flange 45 is secured to the front of housing 14 to aid in seating the latter in recess 43. The front outer edge of flange 45 is chamfered to further help in seating said housing.

Once seated therein, the hydraulic cylinder 24 and associated piston plate 38 are then turned 45°. In FIG. 4, see tab 39a (as inserted) shown in dash-dot outline. The same tab 39 is shown after rotation of 45° (optionally in the direction of the arrow). Then housing plate 36 is bolted to the piston plate 38 with nuts and bolts 40.

A flanged cover 44 is bolted over the free end of the housing 14. Accordingly, the housing 14 may be maintained at the pressure of the reactor 10 and the flanged cover 44 will be subjected only to that pressure. The substantial force which is developed by and exerted upon the hydraulic cylinder 24 will be absorbed by the housing plate 36 (welded directly to the housing 14) and not by the pressure seal of cover 44. As shown in FIG. 2, a pair of roller wheels 46 may be attached in longitudinal alignment to the hydraulic cylinder 24 each by a clamp assembly 48. These drum-shaped rollers 46 assist in the removal of the cylinder 24 during maintenance operations, and in subsequent realignment into socket assembly 43.

Figure 3:
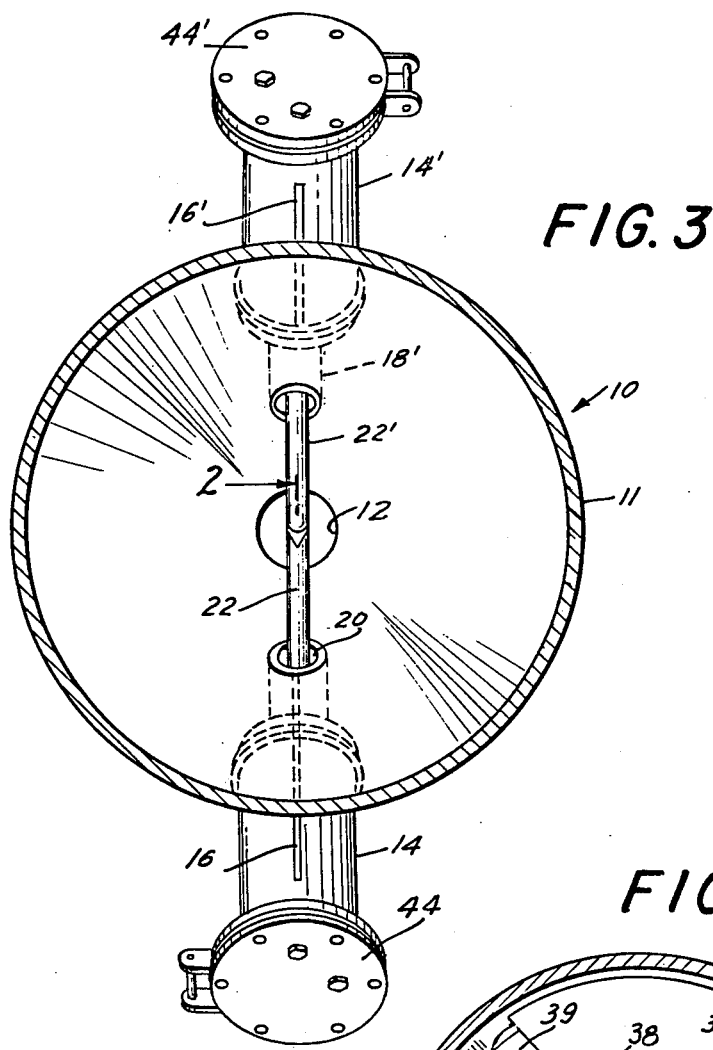
FIG. 3 is a plan view, partially in section, taken on the line 3—3 of FIG. 1, showing the mounting and spacial relationship of the two breaker assemblies with their probes extended.

Referring now to FIGS. 1 and 3 together, there is shown the preferred spacial relationship between two probes 22 when each is extended into the discharge portion 11 of the reactor 10.

The manner in which the breaker probes 22 operate can best be described with reference to FIG. 1. The sponge iron pellets flow downwardly into the lower portion of the reactor 10. Based upon the rate at which the reactor is being charged, the rate of flow out of the outlet 12 is known. When that rate of flow starts to decrease, it is generally due to a blocking agglomeration of solid particles of the sponge iron distorting the mass flow of solid through the reactor. When this decrease in movement of the particulate bed is detected, typically at the output port, one or more of the retractable breaker probes are hydraulically extended into and out of the particulate bed as it moves through the reactor adjacent the outlet port 12. By positioning the breaker probe 22 to act against the bottom of a vertical mass of particles (and preferably towards an opposing wall of portion 11, which backs up the particles being acted upon), the breaker probes effectively break apart any clusters or agglomerations of sponge iron found in the vicinity of the outlet discharge portion 11.

Although two breaker probe assemblies are shown in conjunction with the vertical-shaft moving-bed reactor, depending upon the application, only one breaker probe assembly may need to be employed. Depending upon the mass flow and the particular composition of ore, as well as the process being employed, two, three, four, or more breaker assemblies may advantageously be disposed around the periphery of the reactor at various heights and positions so that any agglomeration of sponge iron found anywhere across the cross-section of the reactor may be reached. Moreover, when the reactor operates under pressure, a plug valve 50 may be employed between the reactor wall and the hydraulic cylinder so as to seal the reactor opening at the probe port 20 to permit repair of the hydraulic cylinder 24, without losing the operating pressure of the reactor 10.

The apparatus may be activated manually or be responsive to a feedback device which measures the rate of outflow of the particulate mass. Similarly, although a number of breaker probe assemblies may be mounted on a reactor, they may be activated so as to operate independently of one another or sequentially.

The probes 22 are advantageously angled to both encourage the downward discharge of the particles and yet still work against the opposite wall of portion 11 when breaking up particle clusters. The probes are located in the lower part of the reactor where the sponge iron is coolest. The unique design permits cluster breaking to proceed without reactor shut-down and without adding obstructions to the uniformity of flow through the reactor. This improves efficiency and reduces fines in the product. Finally, the mechanism is forceful and simple and tends to be maintenance free.

The probe 22 preferably should be conically shaped to avoid lateral forces during use (which could result from using a wedge shape and damage the hydraulic cylinder 24 and supporting structure, if not built to withstand such abuse). The lateral forces could possibly serve some useful purpose aiding in the cluster-breaking, but this has not proven necessary and stronger structure with higher costs are therefore not generally justified.

To facilitate removal and replacement of the probe 22, the latter preferably has four shallow flat grooves 23 (see FIG. 2A and 5 particularly) cut across a circumference of the probe 22 at 90° from each other. The cuts are dimensioned to accommodate the grip of a wrench.

The pressure housing 14 is shown with a drain plug 52 to facilitate tapping off any hydraulic fluid which might accumulate.

The angle $\alpha$ which probe 22 makes with the direction of flow of the particulate mass through the reactor 10 preferably ranges from about 10° to 50°, and in its broader application can range from about 10° to about 90°. If the angle $\alpha$ were to be in excess of 90° this would be normally undesirable because the probe would be acting counter to the direction of particulate flow through the vessel. At the other extreme, the vessel wall under certain circumstances could be vertically disposed at the point where said probe is mounted to said vessel, whereby an angle $\alpha$ on the order of 10° could be appropriate.

Similarly, the angle $\theta$ between the probe and the adjacent wall of said vessel would normally be at least 10° to be effective for the intended purpose, and preferably would range from 15° to 35°.

Figure 5:
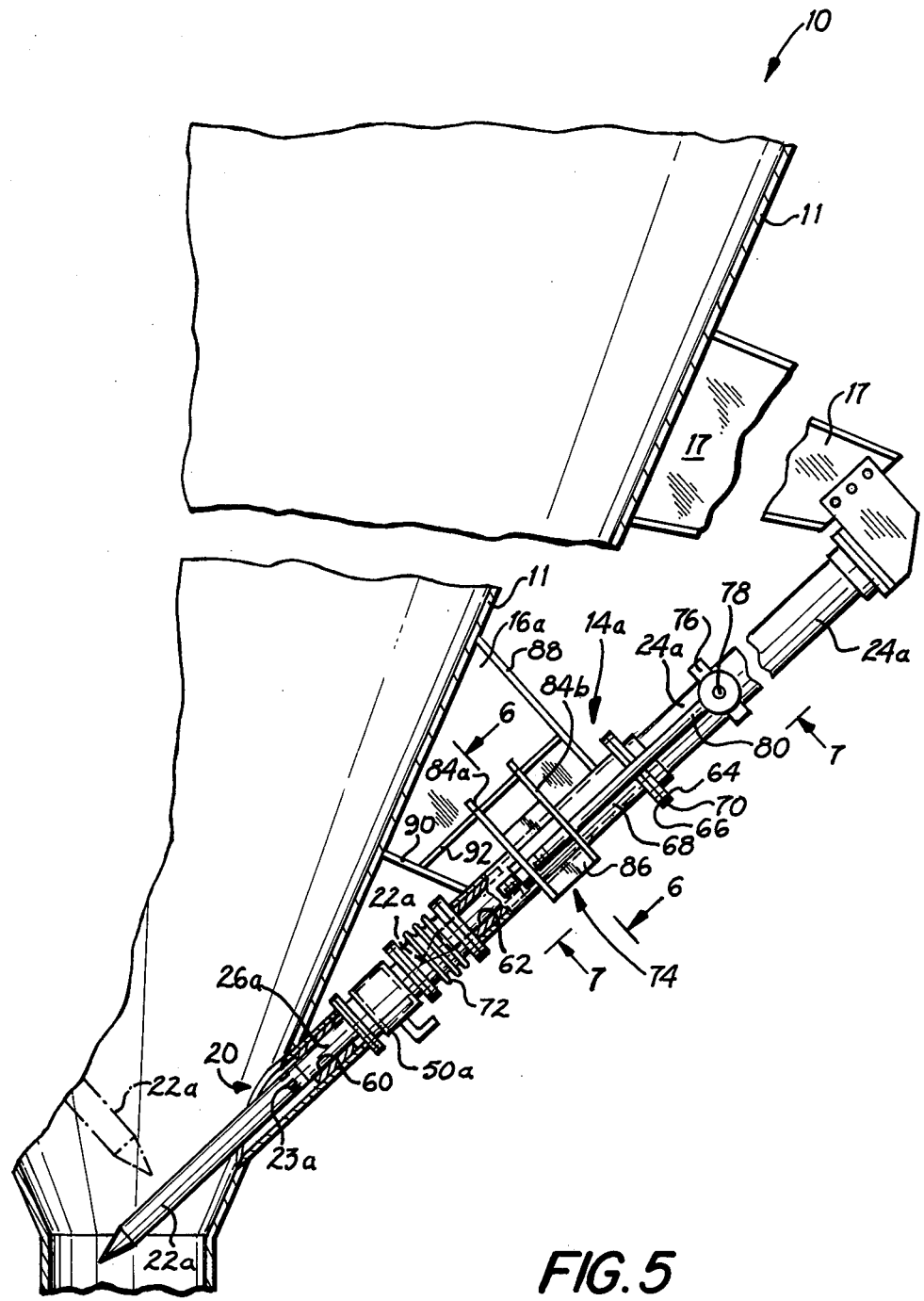
FIG. 5 is a view similar to FIG. 2 of a modified preferred embodiment showing an alternative sealing arrangement around the breaker probe access to the pressurized reactor.
Figure 6:
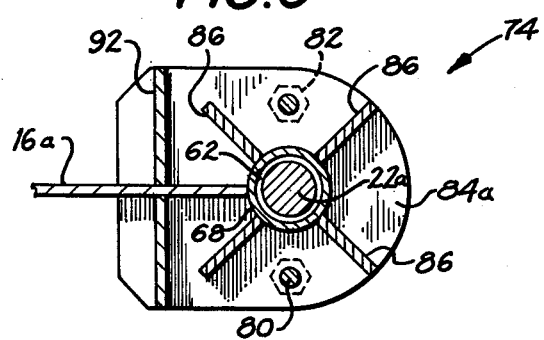
FIG. 6 is a cross-section taken on line 6—6 in FIG. 5, showing the probe housing anchor bracket.
Figure 7:
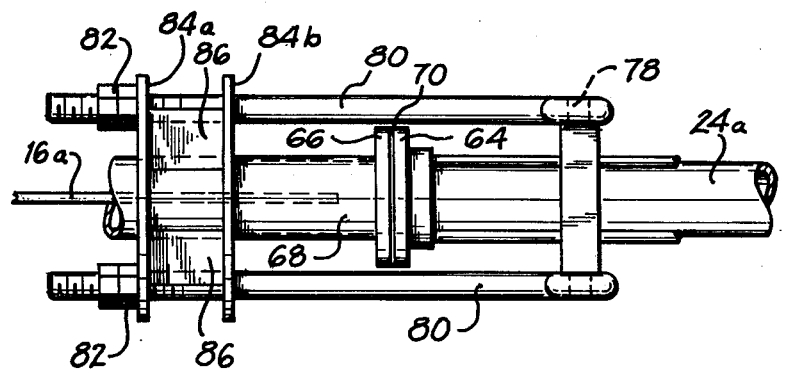
FIG. 7 is a cross-section taken on line 7—7 in FIG. 5, showing the probe housing and hydraulic cylinder brace assembly.

A second preferred embodiment of the present invention is illustrated in FIGS. 5 to 7. In this alternative embodiment, the access of the probe 22a to the pressurized interior of the reactor vessel 10 is through seal bushings 60 and 62. The hydraulic cylinder 24a is not mounted within the breaker housing 14a. Instead, its inner flange 64 mates with a flange 66 of the probe housing 68 to form the outer end of the breaker housing 14a. Flanges 64 and 66 are sealed by a gasket 70.

Probe 22a, mounted on the end of the piston shaft 26a, is illustrated in the extended position in reactor 10 near discharge port 12. The conical end of probe 22a is also shown in dotted outline in its retracted position in FIG. 5 (within bellows connection 72).

The probe housing 68 and cylinder 24a are joined with a brace assembly 74 and are respectively mounted as an axially aligned unit to the discharge portion 11 of the reactor wall by inner support 16a and outer support 17. Thus, the complete breaker assembly comprises hydraulic cylinder 24a, housing 68, and brace assembly 74, all being aligned with probe pipe 18a and valve 50a through the metal pressure bellows 72 (which latter allows for adjustment during mounting. The valve 50a permits the reactor interior to be sealed to enable the removal of the hydraulic cylinder 24a with the probe 22a for servicing.

Bushings 60 and 62 serve as bearings to support the extended probe 22a and as material seals (acting as a barrier to prevent particles and debris from the reactor burden from passing into the probe housing 68 and the hydraulic cylinder 24a). The outboard end of at least seal 60 has a shallow chamfer to aid in centering and aligning the probe 22a passing therethrough.

In order for the reaction forces exerted by the hydraulic cylinder 24a to be adequately supported without putting undue stress on the probe housing 68 and flanges 64 and 66, the brace assembly 74 is secured at one end to the cylinder 24a and is anchored at its other end (with probe housing 68) to support 16a. Brace assembly 74 (see also FIGS. 6 and 7) comprises a yoke 76 having trunnions 78 to which a pair of parallel eye bolts 80 (serving as tie rods) are secured with the threaded ends of the latter being bolted by nuts 82 to an anchor bracket. The anchor bracket comprises parallel plates 84a and 84b stiffened by radial plates 86 centered on and fixed to the probe housing 68. Support 16a is stiffened by fins 88, 90, and 92.

Preferably the diameter of the probe pipe 18a should be determined by the same criteria discussed above with respect to probe pipe 18. The upper end of the lower bushing 60 is positioned well above the dynamic angle of repose for the particulate matter burden of the reactor vessel 10.

The invention, in its broadest aspects, may be employed in the breaking apart of different types of particulate matter in addition to sponge iron, where the material is in particulate form and has a tendency to agglomerate.

What is claimed is:

1. A containment and cluster-breaker apparatus for handling flowing particulate matter, comprising a moving bed reduction vessel for making sponge iron which particulate matter is subject to agglomeration,
    said vessel for containing said particulate matter having a narrowed bottom discharge port and further having a defined direction of flow of particulate matter contained therein,
    a probe mounted on the exterior of said vessel,
    a probe port into the interior of said vessel shaped to accommodate said probe and to prevent escape of particulate matter therethrough,
    actuating means for forcefully extending said probe from a retracted position into the vessel and retracting it back out completely therefrom through said port, said actuating means being adapted to move said probe along a line which extended downwardly makes an acute angle ($\alpha$) relative to the direction of flow of said particulate matter.

2. An apparatus in accordance with claim 1 adapted to break up agglomerated clusters of sponge iron contained therein, wherein said vessel is a pressurized moving-bed vertical-shaft iron-ore reduction-reactor, said reactor vessel defining in its lower portion an at least partially convergent cooling zone resulting in said narrowed discharge port, said apparatus further comprising a pressure housing for said probe in open communication with said cooling zone through said probe port and near said discharge port, whereby said cooling zone and the interior of said housing are maintained at the same pressure.

3. An apparatus in accordance with claim 2, wherein said actuating means is also mounted within said pressure housing.

4. An apparatus in accordance with claim 2, wherein said actuating means is comprised of a hydraulic motor which has a piston with said probe affixed thereto and said vessel has an axis of symmetry.

5. An apparatus in accordance with claim 4, adapted to be operative with a pressure from about 30 to 80 PSIG.

6. An apparatus in accordance with claim 4, adapted to be operative with a temperature of up to about 100° C.

7. An apparatus in accordance with claim 4, further comprising a probe pipe situated intermediate said vessel and said pressure housing and being angularly disposed to accommodate said probe therein.

8. An apparatus in accordance with claim 7, wherein said actuating means is also mounted within said pressure housing.

9. An apparatus in accordance with claim 8, wherein said housing comprises anchoring means for securing said hydraulic motor in place within said housing and separate access means for permitting access to and removal of said hydraulic motor from said housing.

10. An apparatus in accordance with claim 9, further comprising a valve means between said probe port and said housing, whereby said housing with said probe positioned therein can be pressure-isolated from said vessel for servicing of said housing and the elements contained therein.

11. An apparatus in accordance with claim 9, wherein said housing is an elongated cylinder aligned with said probe pipe, and said anchoring means comprises a socket assembly shaped to removably receive and support a front end of said hydraulic motor in position adjacent to and aligned with said probe pipe, a first plate affixed to a rear end of said hydraulic motor, and a second plate fixed to the interior of said housing immediately at a side of the first plate which is opposite the hydraulic motor and partially overlapping the first plate, the first and second plates being demountably joined to one another and being respectively shaped to permit said first plate to be rotated so as to pass said first plate and its affixed hydraulic motor through a cut-out in said second plate.

12. An apparatus in accordance with claim 11, wherein said anchoring means further comprises alignment means including front and rear legs depending downwardly from said hydraulic motor and terminating in anti-friction bearing means, said legs being of a length adapted generally to align the piston of said hydraulic motor with respect to said probe pipe.

13. An apparatus in accordance with claim 11, wherein said access means is a hinged sealing cover plate adapted for sealing said housing.

14. An apparatus in accordance with claim 4, further comprising said pressure housing being a generally elongated cylinder extending between said probe port and said hydraulic motor, with said motor mounted at the end of said housing remote from said probe port, bushing means mounted in said housing to support the probe therein and also to at least partially seal said housing from the vessel.

15. An apparatus in accordance with claim 14, further comprising brace means fixed to said hydraulic motor and braced with respect to said vessel wall for absorbing a major portion of the stresses exerted by said motor.

16. An apparatus in accordance with claim 15, wherein said pressure housing further comprises an elongated cylindrical probe housing closed at one end by said hydraulic motor mounted thereto, and a bellows joint mounted to the other end of said probe housing; and a valve means mounted between said joint and the probe pipe of said probe port; said pressure housing being dimensioned to fully accommodate said probe in its retracted position beyond said valve means.

17. An apparatus in accordance with claims 9 or 16, further comprising feed-back means for monitoring the particulate matter output from said reactor vessel and correlating it with the solids fed to said reactor vessel, said feed-back means being adapted to activate said hydraulic motor to repeatedly extend the probe forcefully into the area of the discharge port whereby any agglomerated clusters of particulate matter engaged thereby are broken apart.

18. An apparatus in accordance with claims 16, wherein said pressure housing has an inner bore which closely accommodates said probe and said bushing means comprises at least two sleeve bushings mounted adjacent either side of said valve means, respectively within said probe pipe and said probe housing.

19. An apparatus in accordance with claim 18, further comprising an inner support mounting said probe housing on said vessel and an outer support mounting the free end of said hydraulic motor on said vessel, and said brace means comprises a yoke secured to said motor and an anchor bracket mounted around said probe housing and secured to said inner support with parallel tie rods joining said yoke and said anchor bracket.

20. An apparatus in accordance with any of claims 1, 4, 3, 9, 13, 14, or 19, wherein said acute angle α ranges from about 10° to up to about 90°.

21. An apparatus in accordance with claim 20, wherein said hydraulic motor and probe combination are dimensioned and positioned to be adapted to extend said probe at least half way across said cooling zone past said axis of said vessel.

22. An apparatus in accordance with claim 20, wherein said acute angle ranges from 30° to about 50°.

23. An apparatus in accordance with claim 20, wherein said probe and the adjacent wall of said vessel make an angle θ of at least 10°.

24. An apparatus in accordance with claim 23, wherein said probe and the adjacent wall of said vessel make an angle θ ranging from 15° to 35°.

25. An apparatus in accordance with claim 20, further comprising a second probe with associated housing and hydraulic motor as claimed with respect to said first probe, said probes being similarly angled to the axis of the reactor vessel and being additionally offset one from the other along the length of said axis and on opposite sides thereof, and each being adapted to extend its respective probe beyond the centerline of said vessel free of said other probe.

26. An apparatus in accordance with claim 25, further comprising feed-back means for monitoring the particulate matter output from said reactor vessel and correlating it with the solids fed to said reactor vessel, said feed-back means being adapted to activate said hydraulic motors so as to repeatedly extend said probes alternately and forcefully into the area of the discharge port whereby any agglomerated clusters of particulate matter engaged thereby are broken apart.

* * * * *